Aug. 3, 1954

C. W. BERTHIEZ 2,685,122

TURRET-HEAD FOR MACHINE-TOOLS WITH ROTATING SPINDLE
SUCH AS MILLING AND BORING MACHINES AND THE LIKE

Filed Aug. 13, 1951

INVENTOR
Charles William Berthiez
By
ATTORNEY

Aug. 3, 1954

C. W. BERTHIEZ 2,685,122

TURRET-HEAD FOR MACHINE-TOOLS WITH ROTATING SPINDLE
SUCH AS MILLING AND BORING MACHINES AND THE LIKE

Filed Aug. 13, 1951

INVENTOR
Charles William Berthiez

By George Horey
ATTORNEY

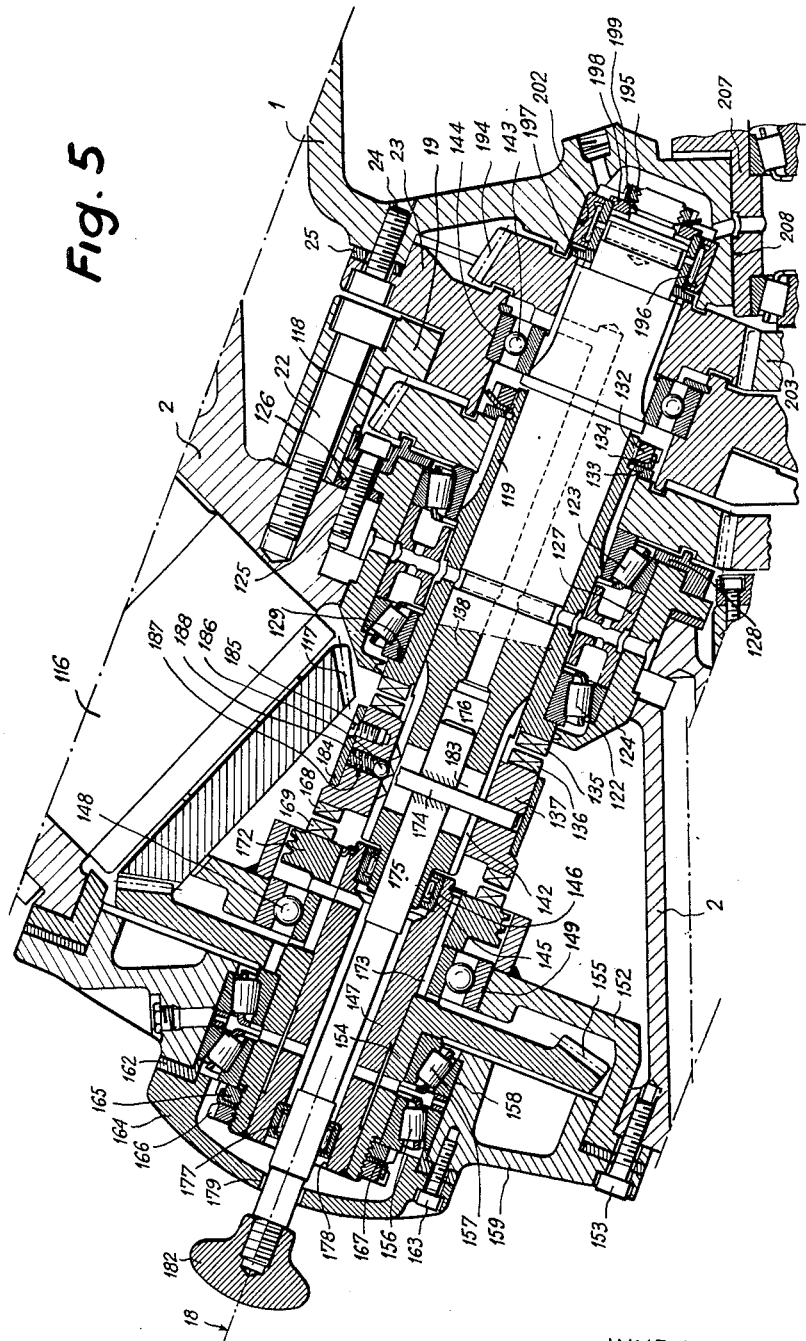

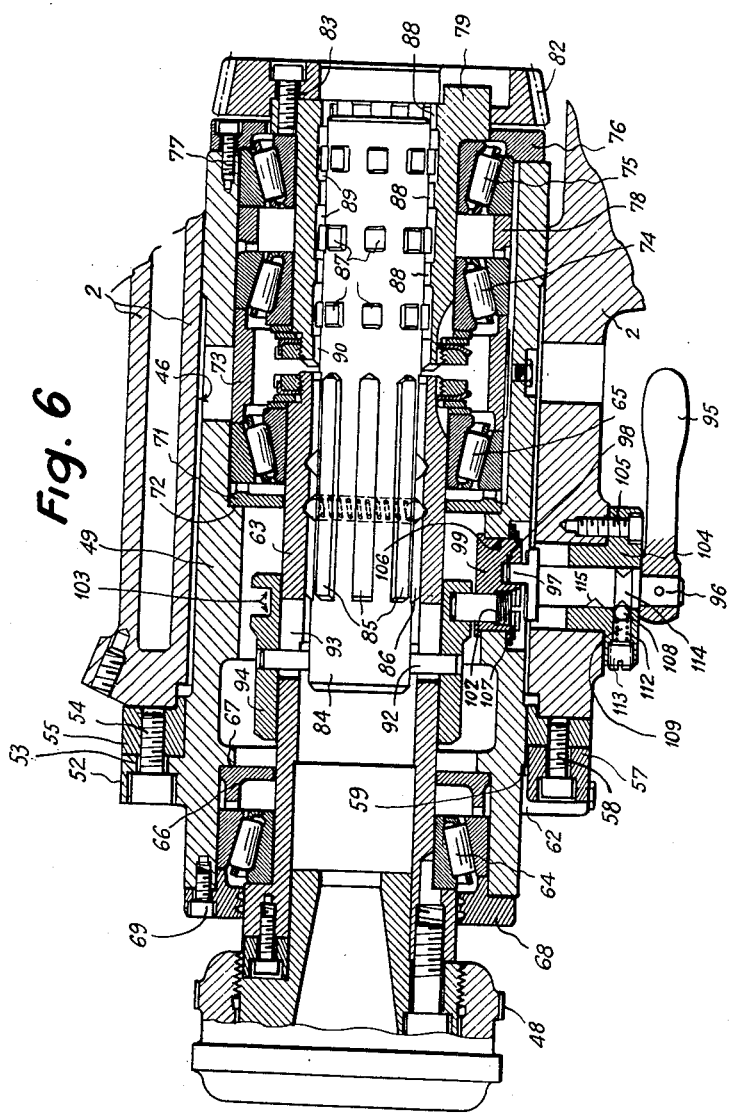

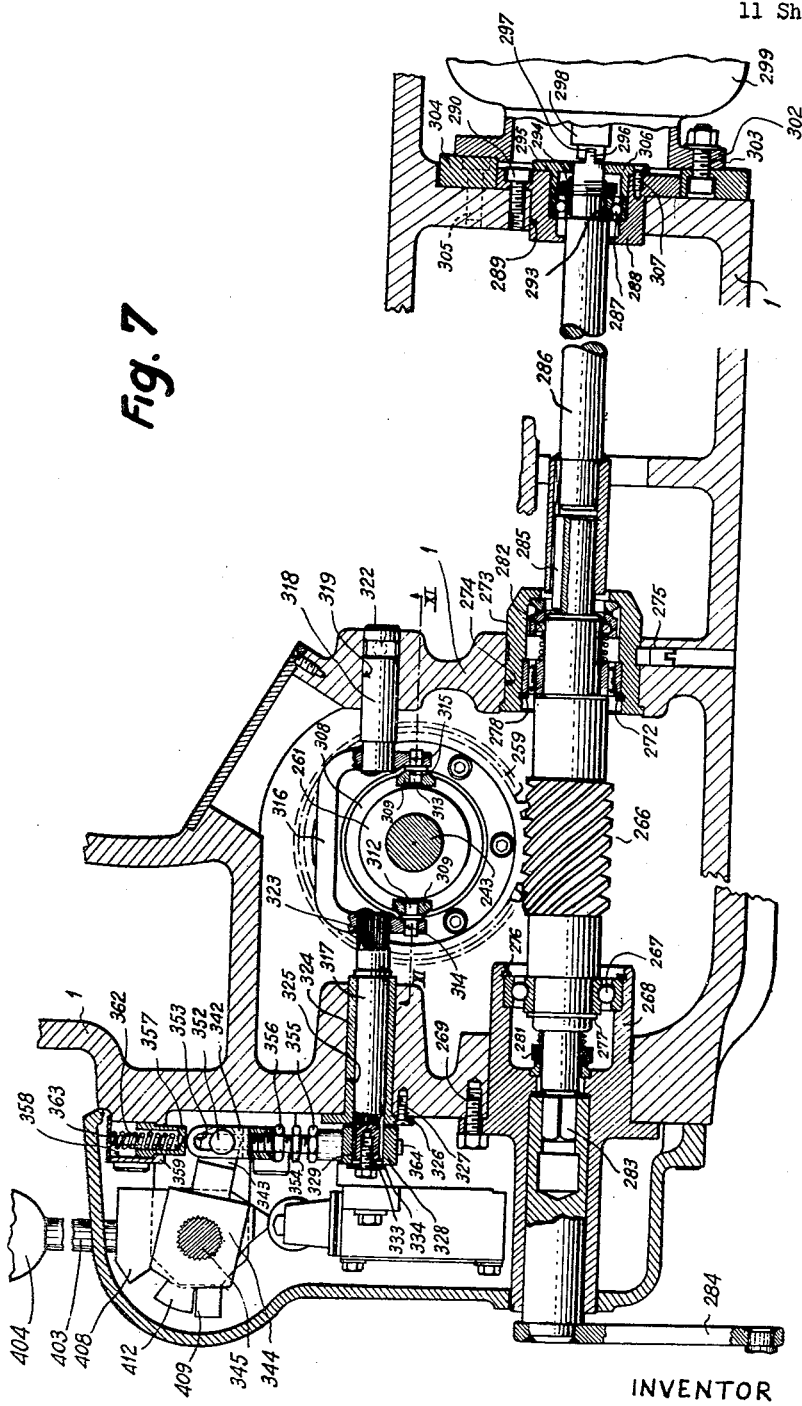

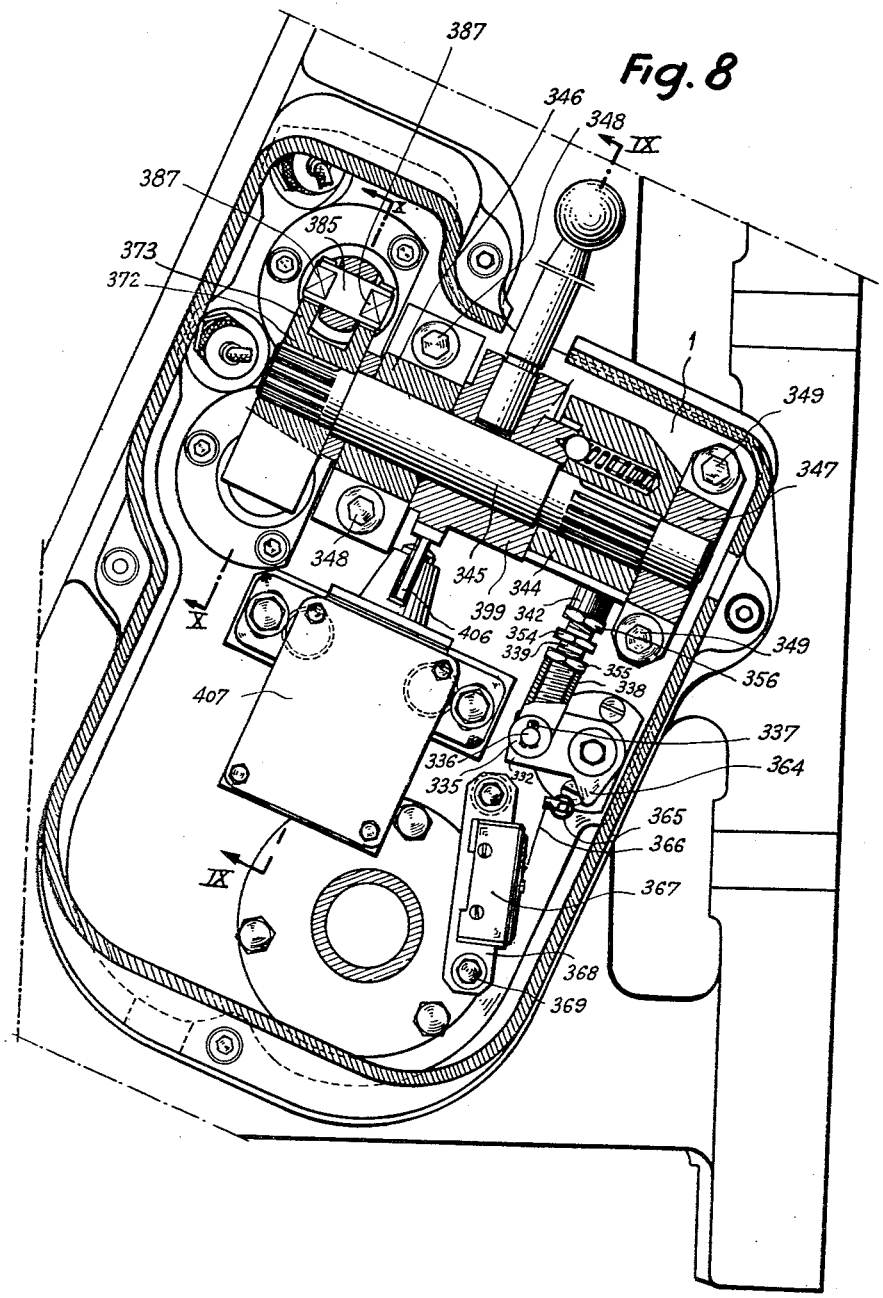

Aug. 3, 1954

C. W. BERTHIEZ 2,685,122

TURRET-HEAD FOR MACHINE-TOOLS WITH ROTATING SPINDLE
SUCH AS MILLING AND BORING MACHINES AND THE LIKE

Filed Aug. 13, 1951

INVENTOR
Charles William Berthiez
By George H. Corey
ATTORNEY

Aug. 3, 1954
C. W. BERTHIEZ
2,685,122
TURRET-HEAD FOR MACHINE-TOOLS WITH ROTATING SPINDLE
SUCH AS MILLING AND BORING MACHINES AND THE LIKE
Filed Aug. 13, 1951
11 Sheets-Sheet 10
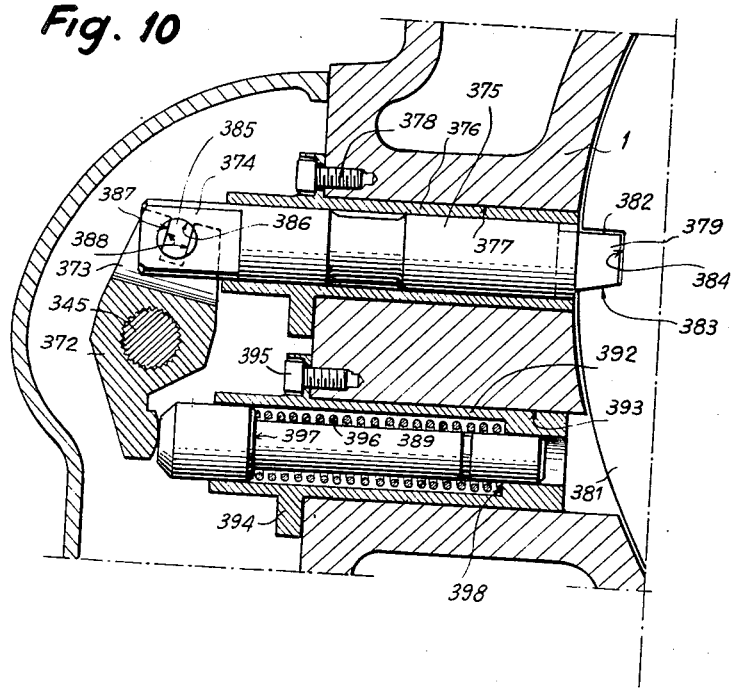
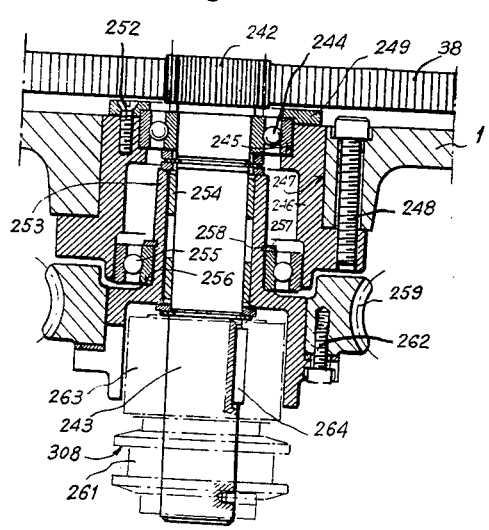
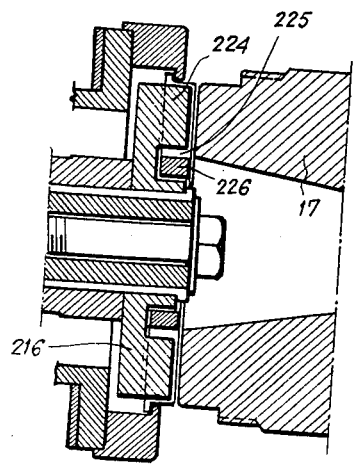
INVENTOR
Charles William Berthiez
By George H. Corey
ATTORNEY Aug. 3, 1954
C. W. BERTHIEZ
2,685,122
TURRET-HEAD FOR MACHINE-TOOLS WITH ROTATING SPINDLE
SUCH AS MILLING AND BORING MACHINES AND THE LIKE
Filed Aug. 13, 1951
11 Sheets-Sheet 11
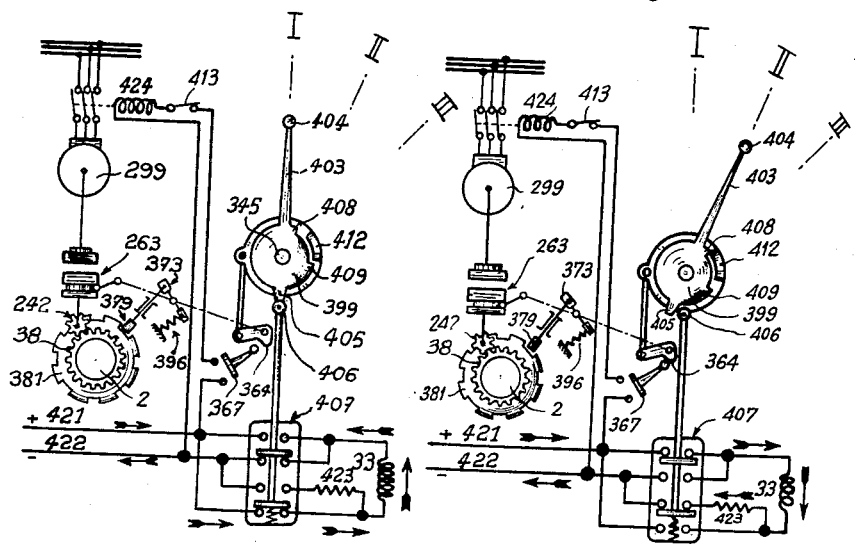
Fig. 15
Fig. 16
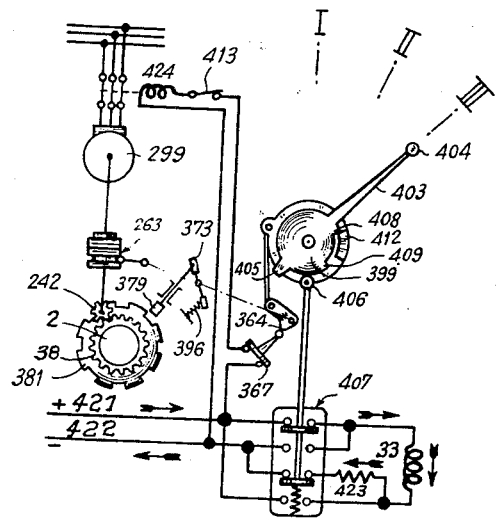
Fig. 17
INVENTOR
Charles William Berthiez
By
George N. Corey
ATTORNEY Patented Aug. 3, 1954

2,685,122

UNITED STATES PATENT OFFICE 2,685,122

TURRET-HEAD FOR MACHINE-TOOLS WITH ROTATING SPINDLE SUCH AS MILLING AND BORING MACHINES AND THE LIKE

Charles William Berthiez, La Cote Bizy Vernon, France, assignor to Societe Anonyme dite: Societe Nouvelle de Construction de Machines Outils et d'Outillages Procédés C. W. B., Paris, France Application August 13, 1951, Serial No. 241,679

Claims priority, application France May 26, 1951

21 Claims. (Cl. 29—26)

Turrets are already known which can be mounted on machine-tools having a rotary spindle, and which are provided with recesses intended to receive various tool-units which can be brought into several positions, such positions being always situated in a given direction with respect to the rotary machine spindle.

In order to perform certain kinds of machining operations it is desirable to use turret-heads in which the tools, when they are brought into their working positions, may be situated in various directions relative to the machine spindle.

It has already been contemplated in my copending application Serial 132,023 filed on December 9, 1949, to build turret-heads of this kind but some difficulties are met in these devices owing to the fact that the machine spindle passes through the turret-head involving a mechanical complication which considerably increases their cost price.

The aim of the present invention is to provide a turret-head meeting the requirements stated above and to design a mechanical embodiment simpler than the turret-head described in said copending application.

One object of the present invention is to provide a turret-head comprising a turret rotatably mounted on a body and adapted to be mounted on a machine tool provided with a rotary spindle, this turret comprising a first series of recesses, any one of these recesses being in the axis of the machine spindle for a series of given angular positions, and a second series of recesses, any one of which is transverse to the spindle for a series of given angular positions of the turret.

Preferably the rotation axis of the turret is oblique with respect to the machine spindle axis in such a manner that it is possible to use one of the tools mounted in the recesses without the other tools being in the way.

Other features and advantages of the present invention will appear from the following specification and from the accompanying drawings in which a simplified representation of one embodiment of the invention is given merely by way of example.

In the drawings:

Fig. 5 is a section, on a larger scale, made on line V—V of Fig. 4;

Fig. 6 is a section, also on this larger scale, made on line VI—VI of Fig. 4;

Fig. 7 is a section, on the same larger scale as the above, made on line VII—VII of Fig. 4;

Fig. 8 is a section, again on the same larger scale, made on line VIII—VIII of Fig. 3;

Fig. 10 is a section, again on the same larger scale, made on line X—X of Fig. 8;

Fig. 11 is a section, on the same larger scale, made on line XI—XI of Fig. 7;

Fig. 14 is a section, on the same larger scale, along line XIV—XIV of Fig. 13;

Figure 1:
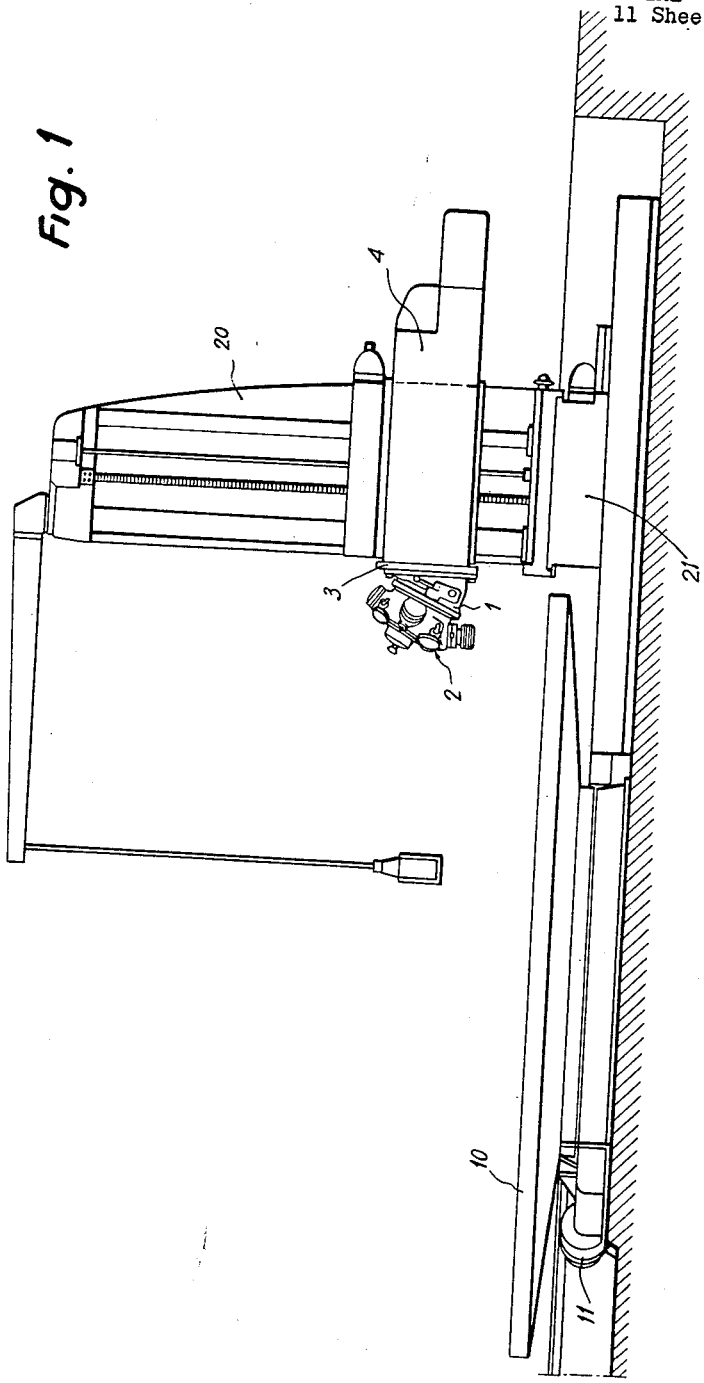
Fig. 1 is an elevational view of a milling and boring machine equipped with a turret-head according to the invention.

Finally, Figs. 15, 16 and 17 are electro-mechanical wiring diagrams showing the device used for rotating the turret in the clamped, in the unclamped and in the rotating positions respectively.

The following is a description of the invention applied to a milling and boring machine fitted with a rotary table by means of which it is possible to perform on a workpiece, vertical turning operations apart from the usual milling and boring operations.

This milling and boring machine comprises essentially a bed 2I on which can slide a column 20, a slide carrying the headstock 4 being adapted to slide up and down this column 20. In the milling and boring machine represented by way of example the headstock 4 is mounted on the slide so that it can be shifted thereon horizontally.

Furthermore, the milling and boring machine, which has been taken as an example, comprises a rotary table 10 for vertical turning work, this table being driven by an electric motor 11.

The turret head which I will now describe makes it possible to easily perform various successive machining operations such as:—vertical turning, flat and cylindrical surfacing, boring, milling, drilling and so on, on the same workpiece without having to reset or take it away from its support, the table 10 in this embodiment.

The assembly of the turret head comprises essentially a body 1 made of light metal (figures 1 to 4), for instance of aluminium alloy, which carries a tool-carrier turret 2 adapted to rotate on said body. This body is secured to a grooved plate 3 arranged on the front face of headstock 4 by means of bolts 5 the heads of which are inserted in grooves 6 of the plate, whereas their nuts 7 bear on the trued face of lugs 8 distributed on the body periphery. The accurate positioning of the body with respect to headstock is ensured, on the one hand, through a centering ring 9 fitted on the body base by means of screws 12 and centered about the bearing casing 13 of the machine spindle sleeve 14 and, on the other hand, by means of a small prismatic block 15 secured to the body 1 by two screws 16 and placed in that one of the grooves 6 which is located in the vertical plane passing through the axis of the spindle 17.

The turret 2, also made of light alloy, can rotate on the body 1 about an axis 18 which is oblique relative to the axis of spindle 17 of the machine. The turret 2 is centered relative to its axis by means of a centering ring 19 (see also Fig. 5) fixed on the turret 2 by screws 22 and by a centering hub 23 clamped on the body 1 by screws 24. Between the centering hub 23 and the body 1 is inserted a shim 25 the thickness of which is determined when the turret is mounted on the body so as to ensure an accurate longitudinal positioning of the hub 23 relative to the body and to leave an adequate longitudinal clearance between the hub 23 and the centering ring 19 carried by the turret 2.

The longitudinal positioning of the turret 2 along its axis of rotation is accurately achieved through an annular bearing surface having a large diameter, arranged near the turret periphery and formed by two mild steel rings one of which 26 is secured to the turret by means of screws 27, whereas the other 28 is fixed to the body 1 by means of screws 29.

The ring 28 carried by the body 1 is provided with an annular groove 32 to house an electric winding 33 in which an electric current can be made to flow so as to build up a mutual attraction of the rings 26 and 28 towards their joining plane. The input and the output of this electrical winding are achieved by means of terminals, such as terminal 34 shown on Fig. 4. Further reference will be made hereinafter to the operation of the magnetic coupling thus provided, the object of which is to firmly clamp the turret against the body 1. In order to prevent the loosening of the turret from the body even when no electric current is flowing in the winding 33 of the magnetic coupling, an annular flange 35 is provided, this flange being fastened to the body by means of screws 36 and fitted with a ledge 37 which slidably bears on the edge of the ring 26 secured to the turret.

The turret 2 and the body 1 being both made of light alloy, the magnetic path of the magnetic coupling is restricted to the two mild steel rings 26 and 28 and, therefore, there are no considerable magnetic losses in the body 1 and in the turret 2.

The rotary motion of the turret on the body is achieved by means of a rotary device to which further reference will be made hereinafter. This device comprises a toothed ring 38 secured to an intermediary ring 39 by means of screws 42 and dowel pins 43, this intermediary ring being fitted to the turret also by screws 44 and dowel pins 45. The object of this intermediary ring 39 is to permit the cutting of the teeth of ring 38 before it is mounted on the intermediary ring.

The turret comprises a first group of, for instance, four cylindrical recesses 46 symmetrically distributed around the axis 18 of the turret and inclined with respect to said axis by such an amount that, by rotating the turret a quarter of a revolution relative to the body, these recesses may be brought in succession in alignment with the axis of the spindle 17, that is to say into a horizontal position. The recesses 46 are intended to receive machining units such as, for example, milling, drilling, tapping, etc ... headstocks, or stationary tools for vertical turning operations, to which further reference will be made.

The turret comprises also a second group of, for instance, four cylindrical recesses 47 likewise symmetrically arranged relative to the axis 18 of the turret but in such a manner that, by rotating the turret a quarter of a revolution, the axes of the recesses 47 are brought successively into a vertical position that is, perpendicular to the spindle axis. In the embodiment represented the horizontal and the vertical recesses are alternate on the turret periphery and are distributed at intervals distant from each other of an eighth of a circumference. As is the case with recesses 46, the recesses 47 are adapted to carry either machining units or stationary tools.

Figure 4:
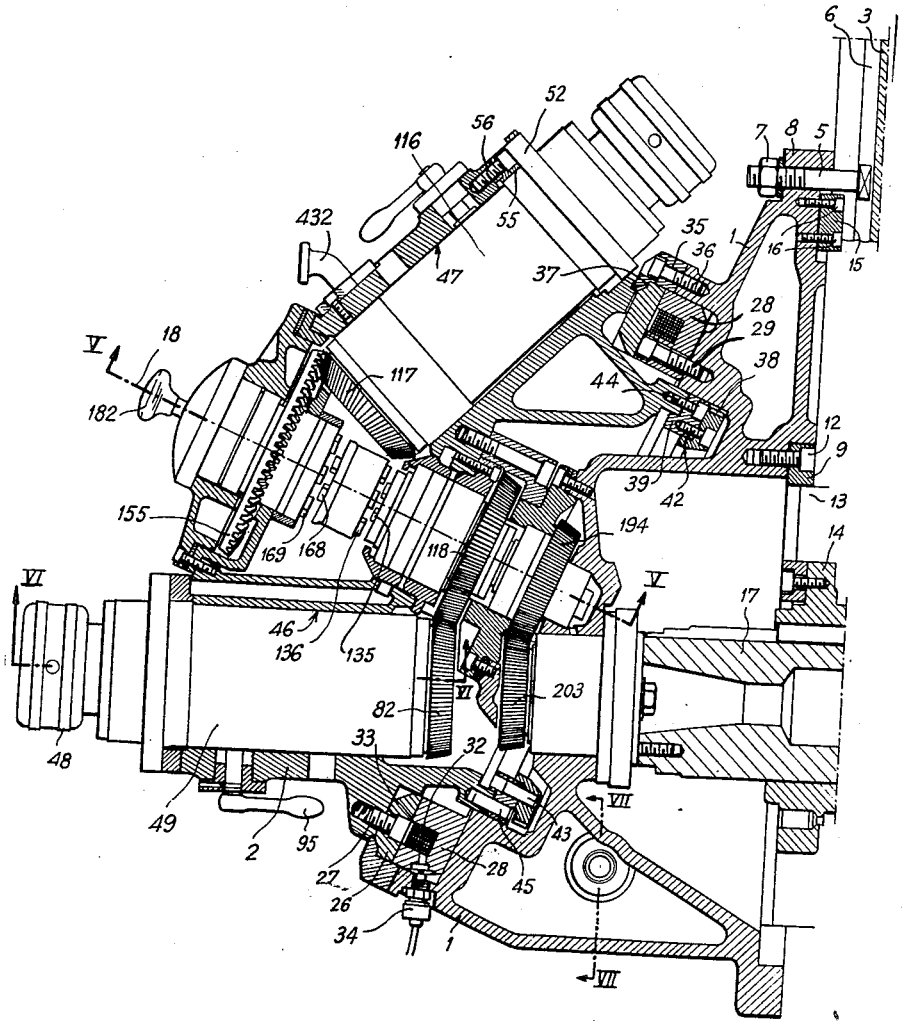
Fig. 4 is a section on line IV—IV of Fig. 3 but in which a machining unit has been represented arranged in one of the recesses whereas in Fig. 3 said recess was fitted with a cover.

By referring now more particularly to figures 4 and 6, I will describe an example of the embodiment comprising a milling unit 48 adapted to be mounted in any one of the recesses above referred to (recess 46 in the drawing) and show how this unit is driven from the machine spindle.

The milling unit 48 comprises a cylindrical body 49 which is fitted freely into the recess 46 and provided with a flange 52 having holes 53 through which screws 54 can be mounted, these being screwed into a ring 55 which is fastened on the end of the recess by means of screws like 56 (seen only on headstock 116 fitted in recess 47). The angular positioning of the body 49 of the machining unit around its axis is ensured by means of a positioning block 57 fastened on ring 55 by a screw 58 and partly engaged in a slot 59 of said ring, said block being adapted to be also engaged into a complementary slot 62 of the flange fastening the body 49 of the machining unit to the turret. It will be seen that the machining unit body 49 bears on the light alloy turret 2 near its inner end and on the bore of the steel ring 55 near its outer end, which end is located near the cutting tools and, therefore, subjected to most considerable fatigue.

Inside the machining unit body, a hollow spindle 63 is rotatably supported by means of two taper roller bearings 64 and 65, one of which, 64, is in engagement with a thrust ring 66 itself held in engagement with a shoulder 67 in the bore of the machining unit body 49 by a cover 68 fastened to said body by screws 69. The other roller bearing 65 is in engagement with a ring 71 which is made to engage another shoulder 72 in the bore of the machining unit body 49 through the medium of a spacing ring 73 and of the outer rings of two further roller bearings 74, 75 by means of a cover 76 fastened to the other end of the body 49 of the machining unit by means of screws 77. The roller bearings 74, 75, which are also separated by a spacing ring 78, are intended to support a tubular shaft 79, on one end of which is fastened by means of screws 83, a driving bevel gear wheel 82. A shaft 84 is splined inside the spindle 63 of the machining unit and inside the tubular shaft 79. The splines on the portion of the shaft which is located inside the spindle 63 are uninterrupted splines 85 and they cooperate with corresponding continuous grooves 86 provided in the bore of spindle 63, whereas the splines of that portion of the shaft 84 which is located inside the tubular driving shaft 79 are broken splines 87 which are adapted to cooperate in an engaged position with portions of complementary grooves 88 provided in the tubular driving shaft 79. When brought into the "engaged" position, the groove portions of the sliding inner shaft 84 are located in recesses 89 of the tubular driving shaft so that, in said position, the inner shaft and the tubular driving shaft are not coupled. In the "engaged" position, the continuous splines 85 of the sliding shaft also cooperate with a set of broken grooves 90 provided on the left end of the tubular shaft 79, the corresponding ends of the continuous splines 85 of the sliding shaft being bevelled so as to facilitate the engagement of the splines. The longitudinal shifting of the inner shaft for the operation of the clutch thus formed is ensured by means of a pin 92 which, in the drawing, is driven through the left end of said shaft and crosses also through an elongated slot 93 cut lengthwise into the thickness of the spindle 63 of the machining unit, whereas both ends of said pin penetrate into two holes drilled through a sleeve 94 adapted to be shifted along the spindle 63. The sliding motion of said sleeve is effected from an engagement controlling handle 95 which is fastened to one end of a rod 96, whose other end is formed with an offset tongue 97 cooperating with a groove 98 also offset and cut into a small plate 99 provided with a screw 102, the smooth end of which is engaged in a circular groove 103 of the sleeve 94. The rod 96 is pivoted in a sleeve 104 secured by screw 105 to the turret 2. The plate 99 is held in a bore 106 of the machining unit body by means of a retaining ring 107 and an adequate clearance is provided to enable the plate to rotate in said bore. The rod 96 can be longitudinally shifted by pushing or pulling the handle 95 so as to engage the tongue 97 into the groove 98, or to disengage it therefrom. A ball 108 housed in a radial hole 109 of sleeve 104 and urged by a spring 112 which is held in position by means of a screw 113, cooperates with a circular groove 114 and a conical recess 115 cut into the rod 96 so as to position said rod in its two longitudinal positions.

It will be seen that, according to the angular position of the handle 95, the engagement-controlling sleeve 94 driven by the tongue 97, can occupy two positions, i. e. the position represented in the drawing, which is the extreme left position where the splines 87 of the inner shaft 84 are not in engagement with the grooves 88 of the tubular driving shaft 79, that is to say the position for which the spindle 63 of the machining unit is disengaged, and a second position for which the sleeve 94 is shifted to the right together with the inner shaft 84, so that the splined portions 87 of said shaft are in mesh with the sections of the complementary grooves 88 of the bore of the tubular driving shaft 79. Finally, when it is desired to pull the machining unit out of the turret, the handle 95 is first pulled so as to shift longitudinally the rod 96 which carries it and this causes the tongue 97 to move into the wall of the turret 2. None of the parts then protudes inside the recess 46 in which the machining unit 49 is housed, so that said unit can be longitudinally pulled out once the fastening screws 54 have been removed. It will be seen further on how the spindle 63 of the machining unit is driven from the machine spindle 17 through the toothed wheel 82.

On Fig. 4 a second machining unit 116 has been represented, the structure of which is identical with that of the machining unit 48 which has just been described. Said machining unit 116 is rotatably driven from a bevel gear wheel 117 similar to the gear wheel 82 of the machining unit 48 but with a different apex angle since the angular positions occupied by these two units relative to the rotary axis of the turret are not the same.

I will now describe the device which drives the gear wheels of both machining units (see particularly figures 4 and 5).

The driving gear wheel 82 of the machining unit 48 is permanently in mesh with another bevel gear wheel 118 keyed on a tubular shaft 119 supported by two taper roller bearings 122, 123 housed in a casing 124 fastened inside the turret 2 by means of screws 125, a shim washer 126 being provided, the thickness of which is determined in the course of the assembling operation. The outer races of said two roller bearings are separated by a spacing ring 127 and they are held in position by an annular part 128 clamped under the heads of screws 125. The inner race of roller 122 is in engagement with a shoulder 129 on the tubular shaft 119, whereas the toothed wheel 118 is in engagement with the inner race of the other roller bearing 123 through a nut 132 screwed on the end of said shaft, a washer 133 and a tongue washer 134 being inserted therebetween.

The left end of the tubular shaft 119 is provided with clutch claws 135 adapted to cooperate with complementary clutch claws 136 of a sleeve 137 the bore of which is formed with longitudinal grooves so as to enable it to slide on a shaft 138 housed inside the tubular shaft 119 and provided with complementary splines 142. Said tubular shaft 138 is held at its right end by a ball bearing 143 housed in a bore 144 of the centering hub 23 carried by the body 1, and, at its left end, by a needle bearing 145 housed in a bore 146 of a spacing ring 148 held by a roller bearing 148 housed in a bore 149 of a casing-like part 152 fastened on the turret 2 by means of screws 153.

The sleeve 147 is welded on the hub 154 of a bevel gear wheel 155 which is in mesh with the driving gear wheel 117 of the machining unit 116, the hub 154 of said gear wheel 155 being supported by two roller bearings 156, 157 fitted in a bore 158 of a cover 159 fastened by screws 153 which also fasten the part 152. The two roller bearings 156, 157 are held inside the cover 159 by means of a ring 162 secured to it by screws 163 which also hold in place a dome 164, whereas their inner races are pressed against the face of the gear wheel 155 through a nut 165 and a check-nut 166 provided with a tongue washer 167.

The grooved sleeve 137 is also provided at its other end with claws 168 adapted to cooperate with complementary claws 169 carried by a ring 172 which is coupled with the spacing sleeve 147 through assembling splines 173. The sliding sleeve 137 can be longitudinally shifted by means of a pin 174 driven across said sleeve and also of a rod 175 which is arranged in the axis of the turret 2, and one end of which is located in an axial bore 176 of the shaft 138, whereas its other end is held in a needle bearing 177 placed in a bore 178 of the sleeve 147. Said end protudes out of a central hole 179 of the dome 164 and is provided with an operating handle 182 screwed on to it. The pin 174 passes through an elongated slot 183 cut into shaft 138. A ring 184 is fitted around sleeve 137 to prevent the pin 174 from coming out and it is held in place by means of screw 185. The sleeve 137 can be brought into three positions on shaft 138, namely: a neutral position which is that represented on Fig. 5, and two engagement positions corresponding respectively to the engagement of the claws on its two faces with the complementary claws of the adjacent parts and, therefore, to the driving of the spindle of one or the other of the two machining units 48 and 116. These three positions can be locked with the help of a device comprising a ball 186 housed in a hole 187 of sleeve 137 and urged by a spring 188 the other end of which bears against the bore of sleeve 184, said ball being adapted to cooperate with three V grooves 191, 192, 193 cut in shaft 138.

The right end of the inner shaft 138 is also splined and carries a bevel gear wheel 194, the hub of which is tightened against the inner race of roller bearing 143 by means of a nut 195 screwed on the end of said shaft, and which also holds the inner race of a needle bearing 196, two washers 197, 198 and a tongue washer 199 being inserted therebetween.

The outer race of said needle bearing is housed in a bore 202 of the body 1.

Figure 13:
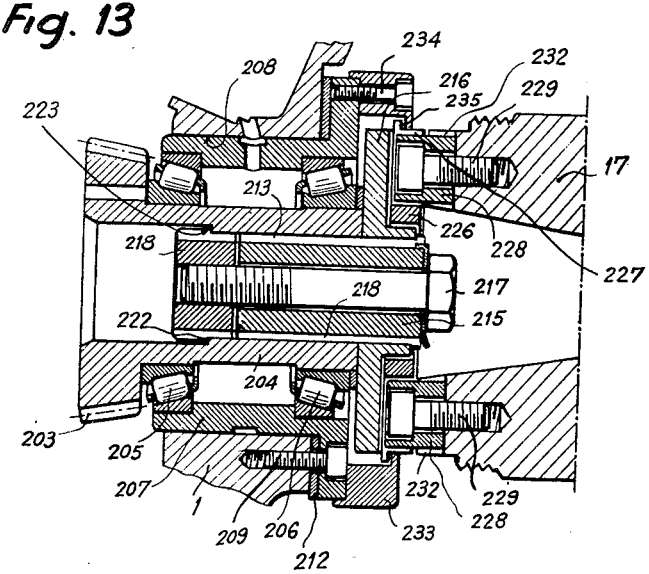
Fig. 13 is a vertical axial section, on the same larger scale as that of Figs. 5 to 11, of the connection device of the milling and boring machine spindle, as well as of the means for driving the machining units.

The bevel gear wheel 194 is in mesh with another bevel gear wheel 203 (see Figures 4 and 13), the hub 204 of which is supported by two roller bearings 205, 206 mounted in a casing 207 which is located in a bore 208 of the body 1 and held in said bore by screws 209, a shim washer 212, the thickness of which is selected when the mounting takes place, being inserted between the body 1 and the casing 207. The gear wheel 203 is driven from the machine spindle 17 through the medium of a device designed as follows:

The hub 204 of the toothed wheel 203 is provided with longitudinal splines 213 which cooperate with complementary grooves cut in a sleeve 215 which is housed in said hub. This sleeve holds a driving plate 216 against the hub end, and the whole is held in place by means of screws 217, the end of which is screwed in a nut 218, the outer face of said nut being provided with grooves cooperating with the inner splines 213 of the hub 204. The nut 218 is formed with a shoulder 222 which bears on a corresponding shoulder 223 provided in the bore of hub 204. The driving plate 216 is fitted with two bosses 224 (Figure 14) housed in slots 225 of a driving disc 226, two other slots 227 (Figure 13) of this disc being intended to receive two blocks 228 fixed by means of screws 229 in two slots 232 cut in the end face of the machine spindle 17. In order to prevent the driving disc from falling away when the turret head is removed from the machine, a collar ring 233 is fastened on the casing 207 by means of screws 234 and cooperates with a flange 235 of the driving disc, the space between the collar ring and the driving disc being large enough to prevent these two parts from coming into contact when the turret is in position on the machine.

From the aforegoing it can be seen that by pulling the clutch operating handle 182, the spindles of the machining units are located in the recesses 47 and are in a position to be driven by the machine spindle 17, whereas by pushing said handle, the spindles of the machining units located in recesses 46 are brought into a position to be driven by said machine spindle. When a machining unit is in its working position, its spindle is actually powered when the handle 95 is set in the engagement position.

To ensure a correct power transmission to the machining unit spindle, it is, of course, necessary that the longitudinal position of the machine spindle 17 be adjusted in such a way that the blocks 228 fixed in its end grooves are properly set in the slots 227 of the driving disc 226.

I will now describe, by referring particularly to Figures 7 to 11, the control devices for rotating the turret on the body and for operating the magnetic coupling which is adapted to clamp the turret on the body, both control devices being linked together and operated from a single three-position lever.

As regards the control gear for rotating the turret it has already been seen that it comprises a toothed ring 38 represented on Fig. 11, which also shows a pinion 242 in mesh with said toothed ring 38 and carried by a shaft 243, whose end adjacent the pinion is supported by a ball bearing 244 housed in a bore 245 of a casing 246 which is fastened by screws 248 in a bore 247 provided in the body 1. The ball bearing 244 is held in place by a plate 249 fastened on the casing face by means of flat cap screws 252. The shaft 243 carrying the toothed pinion 242 is at the same time mounted in a sleeve 253 fitted with a bronze bushing 254 in which the shaft 243 can rotate freely. The sleeve 253 is also supported inside the casing by a ball bearing 255 held in place against a shoulder 256 of said sleeve 253 by means of a retaining ring 257 arranged in a circular groove 258 cut in sleeve 253. On the latter is secured a worm wheel 259 by means of screws 262. The shaft 243 carrying the toothed pinion 242, on the one hand, and the sleeve 253 together with the worm wheel, on the other hand, are adapted to be coupled by means of a multiple disc clutch 263 of any known type. One half of said clutch is keyed to the shaft 243 through a feather 264, whereas the other half is fixedly connected with sleeve 253. The control of said coupling is ensured by means of the longitudinal motion of a sleeve 261 to which reference again will be made.

The worm wheel 259 is rotatably driven by a worm 266 (see Fig 7) carried on a shaft supported at one end in a roller bearing 267 mounted in a casing 268 fastened on the body 1 by screws 269 and, at the other end, in a needle bearing 272 mounted in another casing 273 which is housed in a bore 274 of the body 1 and which is immobilized by means of a headless screw 275. These two roller bearings are held in position by retaining rings 276 and 277 respectively for one of them and 278 for the other. The two ends of the shaft carrying worm 266 are provided with oil-tight seals 281, 282 in order to prevent the oil which lubricates the reducing gear and the roller bearings from escaping outside. One end of the worm shaft is formed into a square portion 283 adapted to receive a crank 284 for controlling by hand the rotative motion of the turret on the body.

The other end of the worm shaft is made to cooperate through the medium of a key 285 with a shaft 286, one end of which is hollow and fitted on the worm shaft while its other end is supported in a ball bearing 287 housed in a casing 288 mounted in a bore 289 of the body 1 and fastened on same by means of screws 290. The bearing 287 is held tightly against a shoulder 293 of the shaft by means of a nut 294 screwed on the end of said shaft, a lock washer 295 being inserted therebetween. The shaft end is formed into a tongue 296 adapted to be driven by a complementary groove 297 cut in one end of the shaft 298 of an electric motor 299 mounted in the body 1 by means of a circular flange 302 concentrically with its shaft and bolted by bolts 303 on a ring 304 which is fastened on body 1 by screws 305. A cover 306 is fastened on the casing 288 by screws 307 and it is intended to immobilize the outer race of roller bearing 287 in the casing 288 and, at the same time, to act as a protecting device to close the roller bearing casing.

In Fig. 7 will be found the control sleeve 261 of the clutch which connects the worm wheel 259 to the pinion-carrying shaft 243. Said sleeve 261 is provided with a circular groove 308 in which are engaged two small bronze blocks 309 carried by stepped studs 312, 313 fitted in holes 314, 315 drilled in the ends of the legs of an inverted U-shaped part 316 which is supported by two shafts 317 and 318 respectively. The shaft 318 is fitted in a bore 319 of the body 1 and immobilized therein by a set screw 322. The U-shaped part 316 is mounted on said shaft so as to freely rotate thereon, whereas the end of the other shaft 317 is provided with longitudinal serrations 323 cooperating with complementary serrations made in the corresponding bore of the U-part, so as to provide for a rigid connection between shaft 317 and the U-part. Shaft 317 is adapted to freely rotate in a sleeve 324 which is fitted in a bore 325 of the body 1 and which is provided with a collar-ring 326 permitting the immobilization of said sleeve relative to the body 1 by means of screws 327.

The other end of shaft 317 is also serrated and adapted to receive a part 328 comprising a bore provided with complementary serrations, and a part 332 in the form of a tenon (see Figure 8). This part 328 is held in position on one end of shaft 317 by means of a screw 333, a washer 334 being inserted therebetween. The tenon 332 of part 328 is placed in a yoke piece 335 and articulated on same by means of a stud 336 held in place by a cotter pin 337. The upper part of the yoke piece 335 is formed into a cylindrical extension 338 provided with a threaded hole in which is screwed one end of a threaded rod 339, the other end of which, also threaded, is screwed into the cylindrical portion of another part 342 which also ends into a yoke-piece articulated on a tenon 343 (see Figure 7) cooperating with a hub 344 the serrated bore of which is pressed on the complementary serrations of a shaft 345 carried by two bearings 346, 347 (see Figure 8) which are secured to the body 1 by means of screws 348 and 349 respectively. The tenon 343 articulates on the yoke-piece 342 through the medium of a pin 352 (Figure 7) which is driven across the ends of the yoke-piece legs in an elongated slot 353 in order to provide for a given dead stroke between the yoke-piece and the tenon. The two yoke-pieces 335 and 342, together with the threaded rod 339, form a connecting rod which connects the two shafts 317 and 345 and the length of which can be adjusted owing to the fact that the threads of two ends of the rod 339 and those of the corresponding yoke-pieces have opposite pitches, an hexagonal collar 354 being provided in the middle of the rod length so that it is possible to seize the rod with a wrench and to rotate it relative to the yoke-pieces. Finally, two check-nuts 355 and 356 are provided to safely clamp together the three parts forming said connecting rod. The said connecting rod is urged downwards by a piston 357 located in a bore 358 of a boss 359 of the body 1, and pushed downwards by a compression spring 362 bearing, on the one hand, on the piston 357 and, on the other hand, on the lower face of a cover 363 fastened on the top of the boss by means of screws not shown.

The part 328 carrying the tenon 332 and fixed on the shaft 317 also comprises a boss 364 (see also Figure 8) adapted to cooperate when the shaft is brought into a given angular position, with a small roller 365 rotatably supported at one end of the resilient blade 366 which acts as a control member of a micro-switch 367 also fastened on the body 1 through the medium of a plate 368 and two screws 369. Said switch 367 controls the electric motor 299 (see Figure 7) through the medium of a contactor which is not shown.

The left end of shaft 345 is also serrated and carries a rocker arm 372 (see also Figure 10) the upper end of which forms a yoke-piece 373, the two legs of this yoke-piece are arranged on each side of a flattened portion 374 at the end of a bolt 375 adapted to slide in a sleeve 376 located in a bore 377 of the body 1 and immobilized on said body by means of screws 378. The right end of the bolt 375 is cut so as to form a finger 379 for the locking and the positioning of the turret on the body, said finger comprising a face 382 parallel to its axis, as well as in inclined face 383, both faces being adapted to cooperate with the faces of the eight complementary notches 384 cut into the circular base 381 of the revolving turret 2 and evenly distributed around a circumference concentric with the turret rotation axis 18. Said device is intended to ensure an accurate positioning of the various machining units in their working position. The connection between the bolt and the rocker arm is secured by a stud 385 adjusted in a hole 386 of the bolt and comprising at each end a flat portion 387 adjusted to freely slide in a corresponding slot 388 cut into the yoke-piece 373 in a plane perpendicular to that of the slot formed by the two yoke legs.

The lower part of the rocker arm 372 bears on the end of a piston 389 adapted to slide inside a sleeve 392 housed in a hole 393 of the body 1 and fitted with a collar ring 394 to fasten said sleeve or body 1 by means of screws 295. The piston 389 is urged against the rocker arm 372 owing to the action of a powerful compression spring 396 bearing on a shoulder 397 of the piston and on a shoulder 398 of the bore of the sleeve 392.

Figure 9:
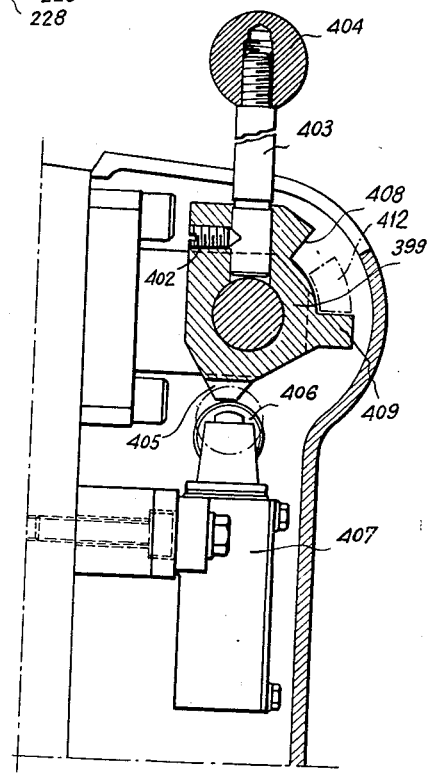
Fig. 9 is a section, on the same larger scale, made on line IX—IX of Fig. 2.

On the shaft 345, between the bearing 346 (see Figure 8) and the hub 344, is mounted a cam 399 which can rotate freely on said shaft and is made rigid with a lever 403 by means of a pointed screw 402 (see also Figure 9). The end of the lever 403 is fitted with an operating handle 404. The cam 399 is provided with a first bump 405 adapted to cooperate, when the lever is in a vertical position, with the control roller 406 of a two-pole double throw switch 407 which permits the reversing of the current in the winding of the magnetic coupling, this taking place in certain special conditions which will be described further on with the aid of an electric diagram. The cam 399 is also provided with two further bumps 408, 409 adapted to cooperate with a corresponding bump 412 of the hub 344 rigid with the shaft 345 in such a way that the lever 403 is made to act, during the first part of its stroke, on the switch 407 and, during the second part of its stroke, on the shaft 345, that is to say, at the same time on the disc clutch 263 of the turret rotation device, and on switch 367 which controls the motor 299 intended to rotate the turret. The shapes of the two bumps 404, 409 on the cam 399 and that of the bump 412 are such that a given dead stroke is provided between cam 399 and hub 344.

The operation of the device controlling the rotation of the turret will be described after examination of the simplified electrical diagram shown on Figures 15 to 17 which show the coil winding 33 of the magnetic coupling. Two lines 421, 422 supplying current to said coil winding, as well as the two-pole double throw switch 407 just mentioned, have been diagrammatically represented. The diagram shows that a resistor 423 has been inserted in the supply circuit of the winding of the electro-magnetic coupling in such a manner that when the turret is to be clamped on the body, the current flows in a given direction on its full supply voltage, where as when the turret revolves on the body, the current flows in the opposite direction in order to destroy any residual magnetism left by the clamping current and to maintain, during the turret rotation, a well defined attractive force with a low value. In the diagram, the control lever 403, the cam 405 operating the controlling roller 406 of the switch 407, and the boss 364 operating the micro-switch 367 which controls the motor 299 through a contactor 424, have also been represented. The clutch 263, which connects the electric motor 299 to the pinion 242 in mesh with the toothed ring 28 secured to the turret, can also be seen on the diagram. The representation of this clutch is made in a very diagrammatic form for the sake of clearness in the drawing, but, as it has already been explained, it is actually a multi-disc clutch. The finger 379 cooperating with the notches of the circular base 381 of turret 2, also appears in the diagram.

The operation of the turret rotation device may be described as follows:

On Fig. 15, the turret 2 is clamped on the body 1 in the position represented by the various figures of the drawing. The control lever 403 is in its idle position, namely position I on the diagram. In said position, a heavy current flows in the winding 33 of the magnetic coupling which clamps the turret on the body, said winding being directly connected to lines 421—422 supplying direct current through the contacts of the two-pole double throw switch 407. The switch 367 arranged in the supply to the coil of the contactor 424 is open, so that the contacts of said contactor are also open and the motor 299 controlling the turret rotation is idle. Finally, the coupling 263 is in the "disengaged" position and the bolt 379 is engaged in a notch of the turret base. In this position, it is possible to operate the tool unit which is in its working position, to effect the desired machining operations.

In order to bring other tools into a working position, the turret is to be rotated by a given angle, for instance an eighth of a revolution. For this purpose, the lever 403 is brought into position II (Figure 16) in order to actuate the double-throw switch 407 so that a current is caused to flow in the opposite direction in the coil winding 33 of the electromagnetic coupling provided to clamp the turret on the body; this reverse current clears the residual magnetism left after the switching off of the clamping current and establishes then a weak current of a definite strength which is determined by the ohmic value of the resistance 423 now inserted in the supply circuit of the magnetic coupling winding 33. When the lever 403 is brought from position I to position II, the double throw switch is the only apparatus that has been actuated; in fact, the energizing of motor 299, the engagement of the mechanical coupling 263, which connects said motor to pinion 242, as well as the operation of the bolt 379, are achieved by means of the cam 412 which up to now has not yet been actuated by the bumps 408, 409 of the lever 403.

The turret is thus unclamped, and in order to rotate it, the lever 403 is brought from position II to position III (see Figure 17). This movement causes the bolt 379 to come out of the turret notch in which it was engaged. When the bolt finger has moved about one half of its stroke, the clutch 263 is thrown into gear and when the bolt is about to be completely disengaged from the notch, the switch 367 is engaged by the bump 364, it closes then and energizes the contactor 424 which starts the motor 299. The turret begins to rotate and the end of the bolt 379 glides on the circular turret base 381. While the turret rotates, the lever 403 can be left in this position or brought back to position II. In any case, as soon as the next notch of the turret base comes into register with the bolt, the spring 396, by pressing on the rocker arm 373, forces the bolt into said notch, said bolt being no longer subjected to any other action such as that of lever 403 in position III. The rocker arm drives the shaft 345 which, in its turn, drives the cam 405 the bump of which releases the roller 406 which actuates the switch 367; the latter opens and breaks the supply circuit of the contactor coil 424; the motor is no longer energized but it keeps running owing to its momentum. Meanwhile, the bolt 369 penetrates further into the notch of the turret base pressing along the inclined face of the notch (see Figure 10). When the bolt is half-way in the notch, the rotation of the rocker arm 373 and of the shaft 345 causes the clutch 263 to be released. Owing to its weight, as well as to the arrangement and the number of the machining units it carries, the turret, by reason of its momentum, is apt to continue its rotating motion, but as soon as the bolt has reached the end of its stroke, the non-inclined notch face hits positively against the corresponding face 382 (see Figure 10) of the bolt, thus immobilizing the turret in the desired position. If for some reason or other due, for instance, to a given distribution of the machining units, the strength of the turret were not sufficient to bring it into its final position, then the inclined bolt face 383, by gliding on the corresponding inclined face of the turret notch, would bring said turret correctly into its final position through the action of the spring 396. Now, the turret has to be clamped again on the body. For this purpose, the lever 403 is brought from position II back to position I and all members are now back in their position as explained at the beginning of this description.

It will be noted that, had the lever 403 been left in position III during the rotation of the turret, the spring 396 would have brought it back to position II through the action of the cam 412 actuating the bump 408 of the lever 403.

For the above described operation, it has been assumed that the turret was to be rotated by an eighth of a revolution. If it is desired to rotate it by a wider angle, it is sufficient to maintain the lever 403 in position III, particularly when a turret notch comes into register with the bolt, as long as it is desired to have the turret go on rotating.

An emergency switch 413 (Figures 15 to 17), by means of which the rotation can be stopped at any time, is provided in the electric circuit of the device controlling the rotation of the turret.

The above description shows how it is possible to mount machining units on the revolving turret, the rotating spindles of said units being driven from the machine spindle. It also shows how the rotation of the turret on the body is achieved.

Figure 12:
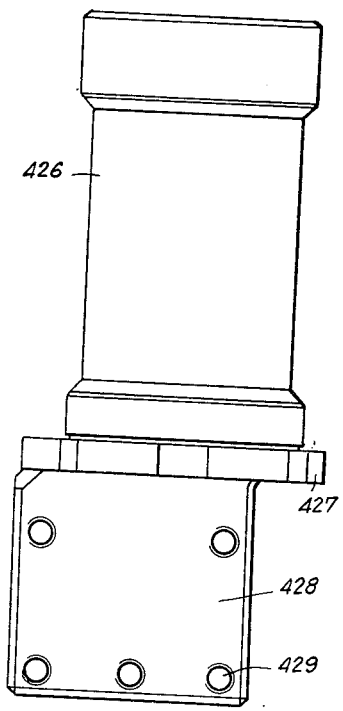
Fig. 12 is an elevational view, on a smaller scale, of a stationary tool-carrier for vertical turning operations which can be placed in any one of the recesses of the turret.

It is possible to mount on the revolving turret stationary tools such as, for instance, tools for vertical turning operations, in the place of the machining units adapted to carry rotatable tools. This feature is illustrated by the example represented on Fig. 12, which shows a turning-tool carrier adapted to be fitted in any one of the recesses provided for the machining units with rotating spindles. Said tool-carrier comprises a cylindrical body 426, preferably hollow so as to keep its weight down; it is fitted with a fastening flange 427 identical with the fastening flanges of the machining units, so that it can be mounted in the recesses in place of said units and fastened on the turret 2 by the same means. Said tool-carrier is provided with a head 428 which is, by way of example, represented with five threaded holes 429 intended to receive screws to fasten the stationary turning tools to be used.

Figure 2:
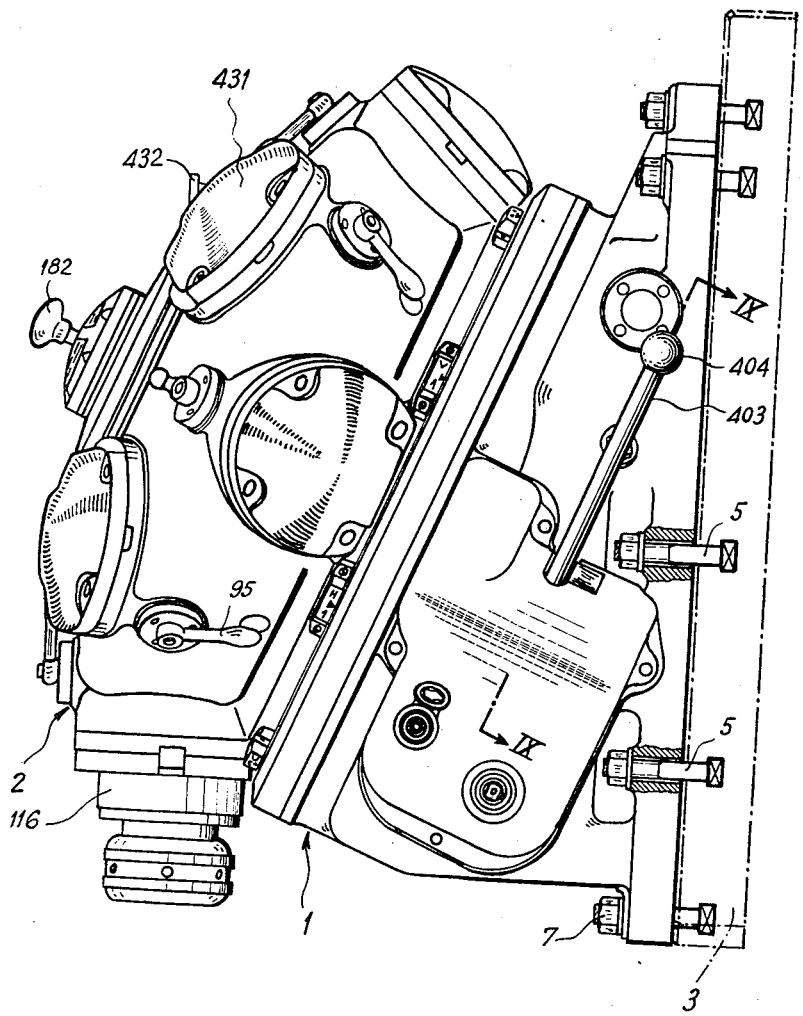
Fig. 2 is an elevational view, on a larger scale, of the turret-head alone separate from the milling and boring machine.
Figure 3:
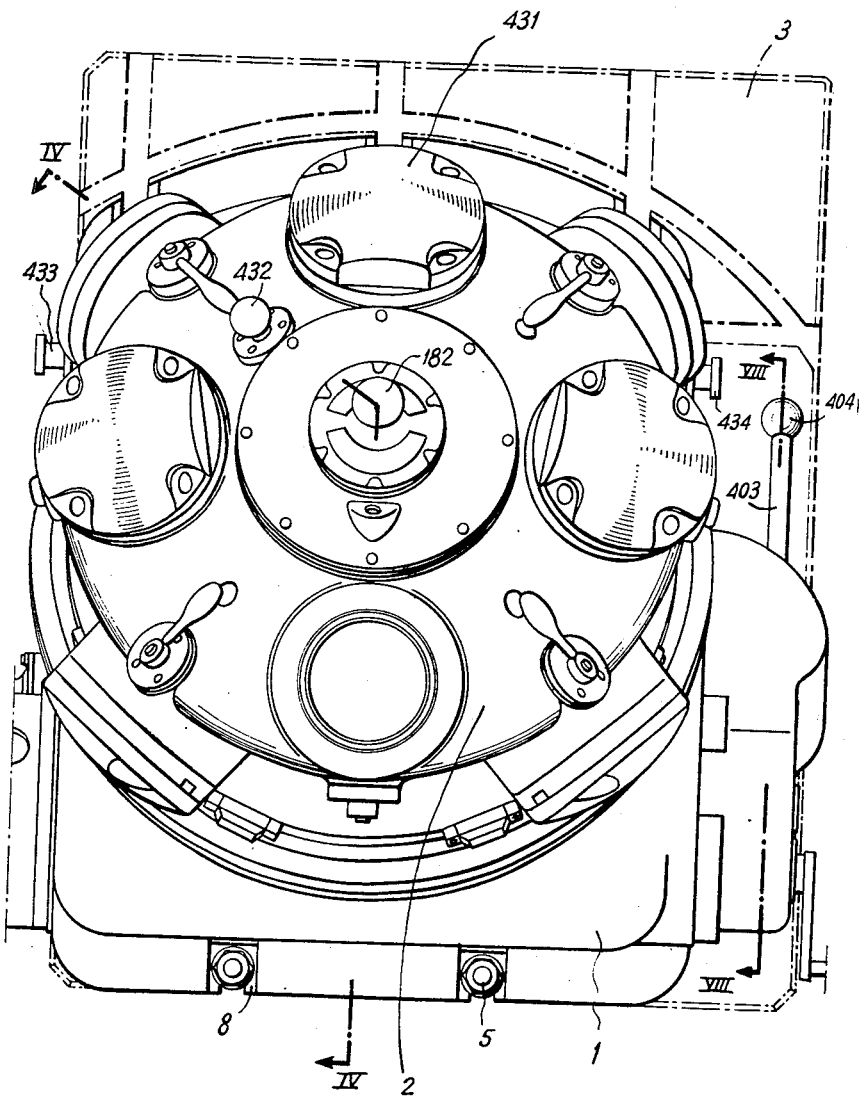
Fig. 3 is a front view of said turret-head having been rotated by an eighth of a turn relative to the representation of Fig. 2.

On Figures 2 and 3, can be seen covers 431 adapted to seal the apertures of the recesses not in use. Said covers are fastened on rings 55, as is the case with flanges 52 of the machining units.

With a view to handling the whole revolving head assembly by means, for instance, of a crane, three sling hooks have been provided, one of said hooks 432 (Figure 4) being fastened on the turret 2, and the other two 433 and 434 (Figure 3) being fastened on each side of the body 1.

It is understood that the present invention is not restricted to the embodiments described and represented, which are given merely by way of examples. Thus, machining units for drilling, boring, tapping and like operations, could be mounted in the place of milling units.

What I claim is:

1. A turret head for a machine tool having a rotatable spindle comprising a body adapted to be supported on said machine tool adjacent said spindle, a turret supported on said body for rotation of said turret on an axis to a plurality of operating positions angularly spaced about said turret axis, said body supporting said turret with the axis of rotation of said turret intersecting the axis of rotation of said spindle when said body is supported on said machine tool, said turret providing a tool unit receiving recess having an axis lengthwise thereof and disposed in said turret with its axis intersecting the axis of rotation of said turret, said turret providing a second tool unit receiving recess having an axis lengthwise thereof and disposed in said turret with its axis intersecting said axis of rotation of said turret at a second point spaced along said turret axis from said point of intersection of said turret axis with said axis of said first recess.

2. The turret-head of claim 1 including a toothed ring secured to said turret co-axially therewith, a shaft rotatably mounted in said body, a pinion fixed on said shaft and in mesh with said toothed ring secured to said turret, reduction gears and clutch means mounted in said body, and an electric motor secured to said body and operatively connected to said shaft through said reduction gears and said clutch means for rotatably driving said turret.

3. The turret-head of claim 1 including a device for positioning and locking said turret on said body in its various operating positions, said device comprising a bolt mounted in the body adjacent the base of said turret and adapted to cooperate through one of its ends with notches formed in the turret base in number equal to that of the turret recesses, said end of the bolt cooperating with said notches having at least one inclined face adapted to cooperate with a face of said notches inclined in a like manner, and resilient means for urging said bolt against the base of said turret so as to engage said bolt into any of said notches coming in register therewith.

4. A turret head for a machine tool as defined in claim 1 in which the axis of said second recess intersects said turret axis at an angle different from the angle between said axis of said first recess and said turret axis.

5. A turret head for a machine tool as defined in claim 1 in which the axes of said recesses are oppositely inclined with respect to said turret axis.

6. A turret head for a machine tool having a rotatable spindle comprising a body adapted to be supported on said machine tool adjacent said spindle, a turret supported on said body for rotation of said turret on an axis to a plurality of operating positions angularly spaced about said turret axis, said body supporting said turret with the axis of rotation of said turret intersecting the axis of rotation of said spindle when said body is supported on said machine tool, said turret providing a tool unit receiving recess having an axis lengthwise thereof and disposed in said turret with its axis intersecting the axis of rotation of said turret at the point of intersection of said turret axis with the axis of the spindle, said turret providing a second tool unit receiving recess having an axis lengthwise thereof and disposed in said turret with its axis intersecting said axis of rotation of said turret at a second point spaced along said turret axis from said point of intersection of said turret axis with said axis of said first recess.

7. A turret head for a machine tool having a rotatable spindle comprising a body adapted to be supported on said machine tool adjacent said spindle, a turret supported on said body for rotation of said turret on an axis to a plurality of operating positions angularly spaced about said turret axis, said body supporting said turret with the axis of rotation of said turret intersecting the axis of rotation of said spindle at an oblique angle and at a predetermined point on said turret axis when said body is supported on said machine tool, said turret providing a plurality of tool unit receiving recesses each having an axis lengthwise thereof and disposed in said turret with their respective axes intersecting the axis of said turret at equal angles and at said predetermined point on said turret axis, said turret providing a plurality of tool unit receiving recesses each having an axis lengthwise thereof and disposed in said turret with the respective axes thereof intersecting said axis of rotation of said turret at a common point spaced along said turret axis from said predetermined point thereon and at equal angles with respect to said turret axis different from the angle between said axes of said first recesses and said turret axis.

8. In a machine tool having a rotatable spindle, and a member supporting said spindle for rotation thereof, the combination with said member and spindle, of a body supported on said member adjacent said spindle, a turret supported on said body for rotation of said turret on an axis to a plurality of operating positions, angularly spaced about said turret axis, said body supporting said turret with the axis of rotation of said turret intersecting the axis of said spindle, said turret providing a tool unit receiving recess having an axis lengthwise thereof and disposed in said turret with its axis intersecting the axis of rotation of said turret at the point of intersection of said turret axis with the axis of the spindle, said turret providing a second tool unit receiving recess having an axis lengthwise thereof and disposed in said turret with its axis intersecting said axis of rotation of said turret at a second point spaced along said turret axis from said point of intersection of said turret axis with said spindle axis.

9. In a machine tool having a rotatable spindle, and a member supporting said spindle for rotation thereof, the combination as defined in claim 8 in which the axis of said second recess intersects said turret axis at an angle different from the angle between said axis of said first recess and said turret axis.

10. In a machine tool having a rotatable spindle, and a member supporting said spindle for rotation thereof, the combination as defined in claim 8 in which the angle between the axis of said first recess and said turret axis is equal to the angle between said turret axis and said spindle axis, whereby said first recess may be moved into position with its axis in alignment with said spindle axis.

11. In a machine tool having a rotatable spindle, and a member supporting said spindle for rotation thereof, the combination as defined in claim 8 which comprises a shaft supported in said turret coaxially with the axis of rotation of said turret, a driving connection between said machine spindle and said shaft for rotating said shaft upon rotation of said machine spindle, clutch means supported in said turret and operatively connected to said shaft and operable between an inoperative position and a driving position, said clutch means in said driving position being operatively connected to transmission means supported in said turret, said transmission means being operatively connectible to a tool unit supported in a selected one of said recesses for driving said tool unit upon rotation of said shaft.

12. In a machine tool having a rotatable spindle, and a member supporting said spindle for rotation thereof, the combination as defined in claim 11 in which a tool unit supported in a selected recess is provided with a spindle rotatable on its axis and adapted rotatably to drive a tool, said tool unit being provided with a clutch and means operatively connecting each clutch to said transmission means, said clutch being operable to connect said tool unit spindle to said transmission means for driving said tool unit spindle on rotation of said shaft.

13. In a machine tool having a rotatable spindle, and a member supporting said spindle for rotation thereof, the combination as defined in claim 8 which comprises a shaft supported in said turret coaxially with the axis of rotation of said turret, a driving connection between said machine spindle and said shaft for rotating said shaft upon rotation of said machine spindle, clutch means supported in said turret and operatively connected to said shaft and selectively operable to two driving positions, said clutch means in said positions respectively being connected to two transmission means supported in said turret and respectively operatively connectible tool units supported in the respective recesses for selectively driving said tool units upon rotation of said shaft.

14. In a machine tool having a rotatable spindle, and a member supporting said spindle for rotation thereof, the combination as defined in claim 8 which comprises means supported on said body and operatively connected to said turret and operable for rotating said turret on its axis to dispose said recesses in selected positions with respect to said machine spindle axis.

15. A turret head for a machine tool having a rotatable spindle comprising a body adapted to be supported on said machine tool adjacent said spindle, a turret supported on said body for rotation thereof on an axis to a plurality of operating positions angularly spaced about said turret axis, a first series of recesses respectively having axes lengthwise thereof and disposed in said turret with their axes intersecting the axis of rotation of said turret at a first predetermined point on said turret axis, said body supporting said turret so that said axes of said first series of recesses are movable in succession into a position in alignment with the axis of the machine spindle for the respective angularly spaced positions of said turret about its axis, a second series of recesses respectively having axes lengthwise thereof and disposed in said turret with their axes intersecting said axis of rotation of said turret at a second predetermined point spaced along said turret axis from said first predetermined point, the axes of said recesses of said second series being movable in succession into a position in transverse relation with respect to the axis of said machine spindle for the respective angularly spaced positions of said turret about its axis, the recesses of both said first and second series of recesses being adapted respectively to receive tool units each having a rotatable spindle and an individual gear wheel operatively connectible to its unit spindle for rotation therewith, a shaft supported in said turret coaxially with the axis of rotation of said turret, first and second auxiliary gear wheels supported on said shaft for rotation relative thereto on the axis of the shaft and respectively in mesh with said individual gear wheels of said units when supported respectively in recesses of said first and second series of recesses, clutch means supported in said turret and operatively connected to said shaft and selectively operable to connect said first and second auxiliary gear wheels to said shaft for selectively rotating said auxiliary gear wheels upon rotation of said shaft, an intermediate gear wheel fixed upon said shaft for rotation therewith, a main gear wheel supported in said body in mesh with said intermediate gear wheel, and means supported in said body and operatively connected to said main gear wheel and operatively connectible to said rotatable spindle of said machine tool when said body is supported on said machine tool for driving said main gear wheel and said shaft and said tool units upon rotation of said spindle and operation of said clutch means.

16. A turret head for a machine tool having a rotatable spindle as defined in claim 1 in which said body and said turret are made of non-magnetic material and each is provided with a ring of magnetic material in fixed relation thereto and coaxial with the axis of rotation of said turret, said rings being disposed in face to face relation to each other, at least one of said rings being provided with an electric winding for producing a magnetic field therein and inducing a field in said other ring to insure magnetic clamping of said turret on said body.

17. A turret head for a machine tool having a rotatable spindle comprising a body adapted to be supported on said machine tool adjacent said spindle, a turret supported on said body for rotation of said turret on an axis to a plurality of operating positions angularly spaced about said turret axis, said body and said turret being made of non-magnetic material and each provided with a ring of magnetic material in fixed relation thereto and coaxial with the axis of rotation of said turret, said rings being disposed in face to face relation to each other, and an electric winding supported by said body so as to produce in at least one of said rings a magnetic field inducing a magnetic field in said other ring to insure magnetic clamping of said turret on said body.

18. A turret head for a machine tool having a rotatable spindle as defined in claim 17 which comprises a double throw switch and a resistor in circuit with said winding and connectible to a source of electrical supply, said switch and said resistor being connected in said circuit in one position of the double throw of said switch corresponding to the clamped position of said turret on said body so that said winding is connected directly to said source of electrical supply and in the other position of the double throw of said switch corresponding to the unclamped position of said turret said winding is connected to said source of electrical supply through said resistor.

19. A turret head for a machine tool having a rotatable spindle as defined in claim 18 in which said double throw switch and said resistor are connected in circuit to said supply for reversing the polarity across said winding when said supply is a direct current supply upon operation of said double throw switch from a given position to the other so as to oppose the magnetism residual from the connection in said given position and to produce a weak magnetic field for slight frictional engagement of said faces of said rings.

20. A turret head for a machine tool having a rotatable spindle as defined in claim 18 which comprises a toothed ring secured to said turret coaxially therewith, an auxiliary shaft supported in said body for rotation thereof on its axis, a pinion fixed to said auxiliary shaft and in mesh with said toothed ring for rotating said ring and said turret upon rotation of said auxiliary shaft, clutch means operable to a position for driving connection with said shaft, an electric motor supported by said body and operatively connected to said clutch means for driving said clutch means, a starting switch for said motor, a single three position lever operable to a first position corresponding to clamping of said turret on said body and operatively connected to said double throw switch to operate said switch to said position connecting said winding directly to said electrical supply, said lever being operable to a second position corresponding to unclamping of said turret from said body and operatively connected in said position to said double throw switch to operate said switch to connect said winding to said supply through said resistor, said lever being operable to a third position corresponding to rotation of the turret on said body and operatively connected in said position to said clutch means and to said starting switch to operate said clutch means to driving position and said starting switch to motor starting position.

21. A turret head for a machine tool having a rotatable spindle as defined in claim 18 which comprises a member carried by said turret and providing notches peripherally disposed about the axis of said turret in spaced relation corresponding to the respective operating positions of said turret, a bolt mounted in said body adjacent said member and movable into and out of position to engage the respective notches in said member upon rotation of said turret, driving means supported in said body and operatively connected to said turret and operable for rotating said turret on its axis and for stopping said rotation, and means operatively connecting said bolt to said double throw switch and to said driving means for operating said bolt to hold said turret against rotation thereof and to release said turret for rotation thereof concomitantly with operation of said double throw switch respectively to clamping and unclamping positions and said driving means respectively to stop and to rotate said turret, said operative connection comprising a lost motion device to provide for operation of said double throw switch between said two positions thereof while retaining said bolt in said engaging position and said driving means in stopped position.

References Cited in the file of this patent

UNITED STATES PATENTS

| Number | Name | Date |
|---|---|---|
| 988,231 | Vernet | Mar. 28, 1911 |
| 1,737,846 | Hodgson | Dec. 3, 1929 |
| 1,924,383 | Stampfli | Aug. 29, 1933 |
| 2,359,161 | Scates | Sept. 26, 1944 |
| 2,481,642 | Bohmer et al. | Sept. 13, 1949 |